Figures 1, 2, 3:
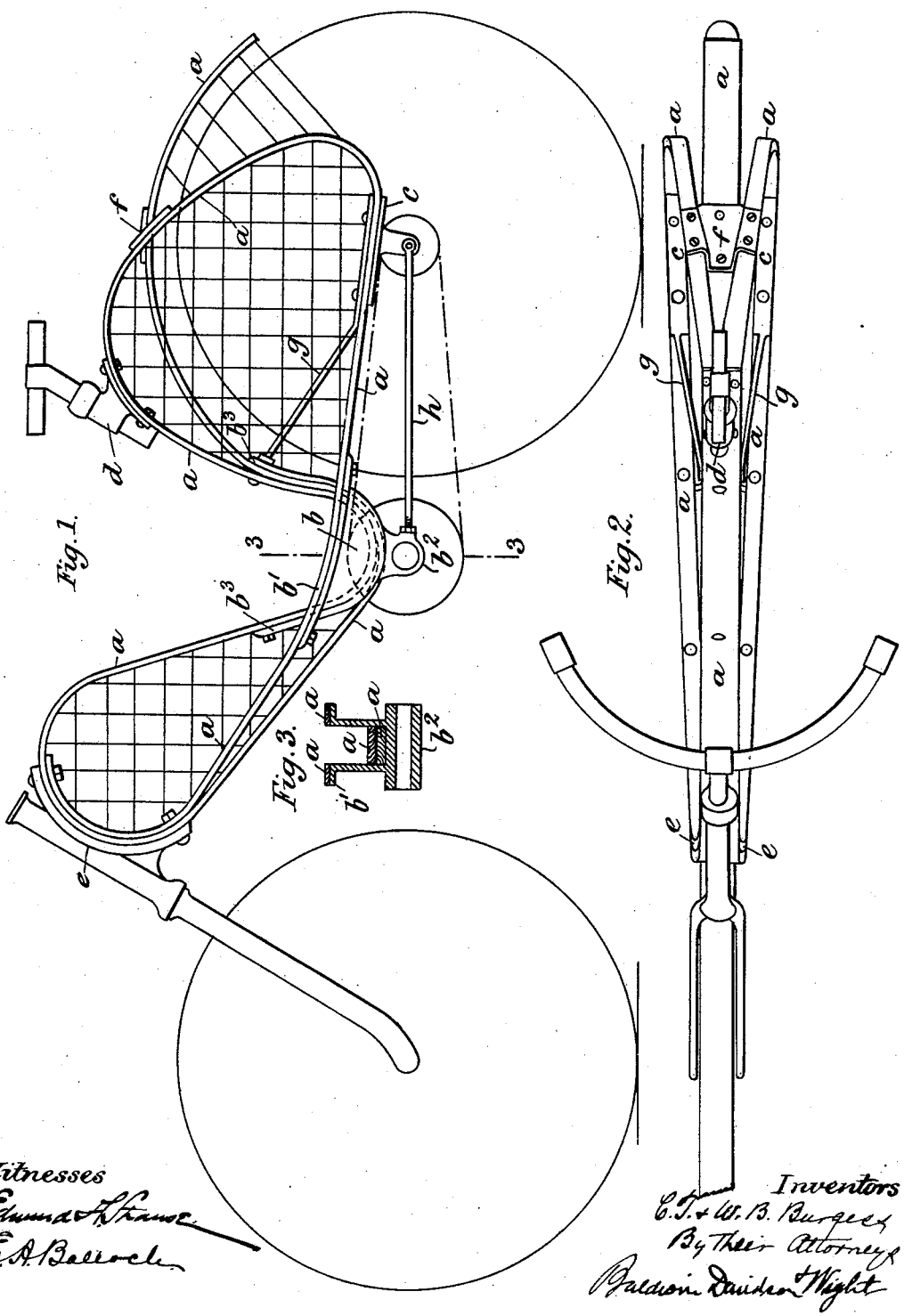

No. 606,704. Patented July 5, 1898.
C. T. & W. B. BURGESS.
BICYCLE.
(Application filed Aug. 9, 1897.)
(No Model.) 3 Sheets—Sheet 1.

Witnesses
Inventors
C. T. & W. B. Burgess
By their Attorneys

No. 606,704. Patented July 5, 1898.
C. T. & W. B. BURGESS.
BICYCLE.
(Application filed Aug. 9, 1897.)
(No Model.) 3 Sheets—Sheet 2.
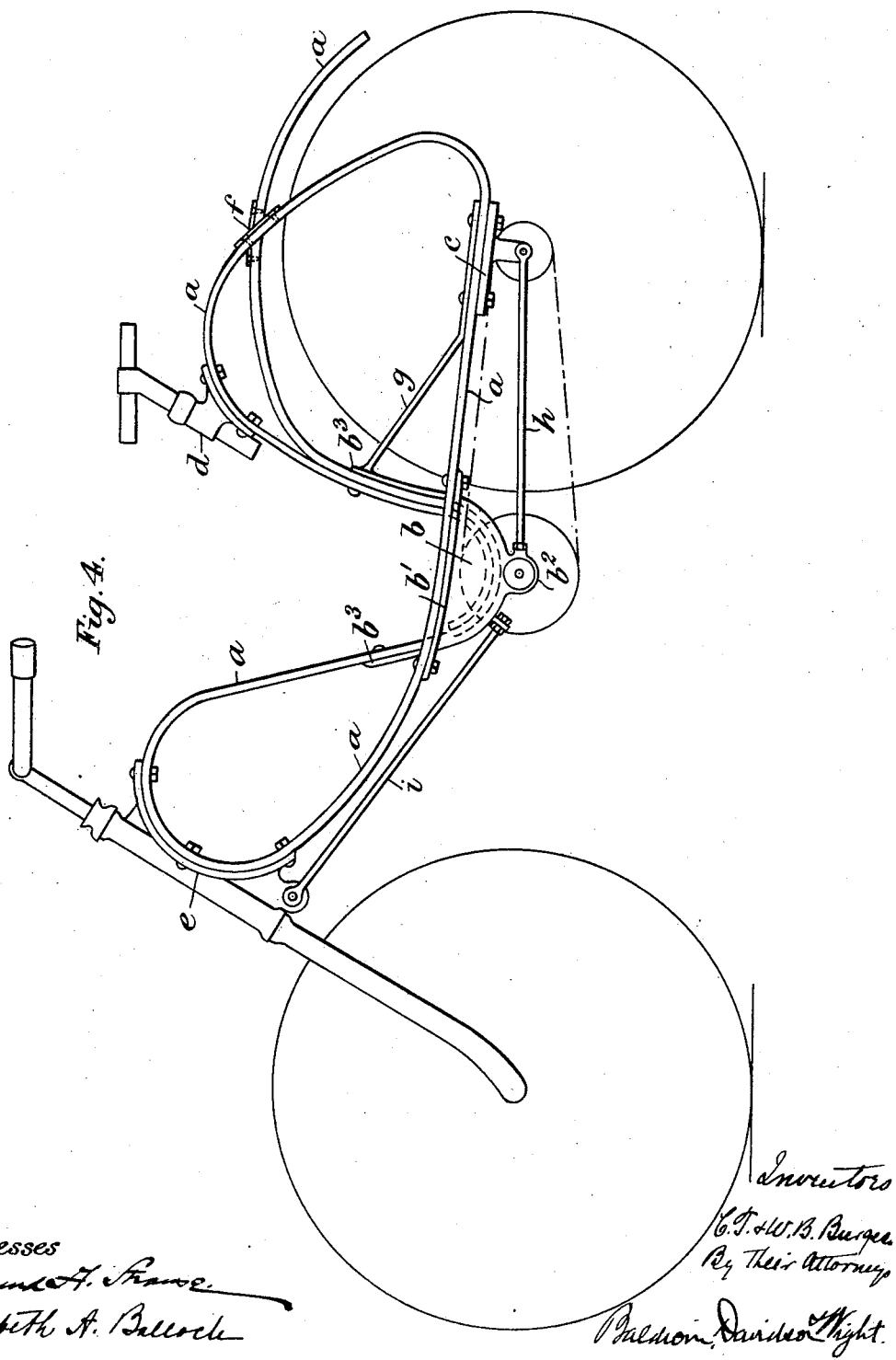

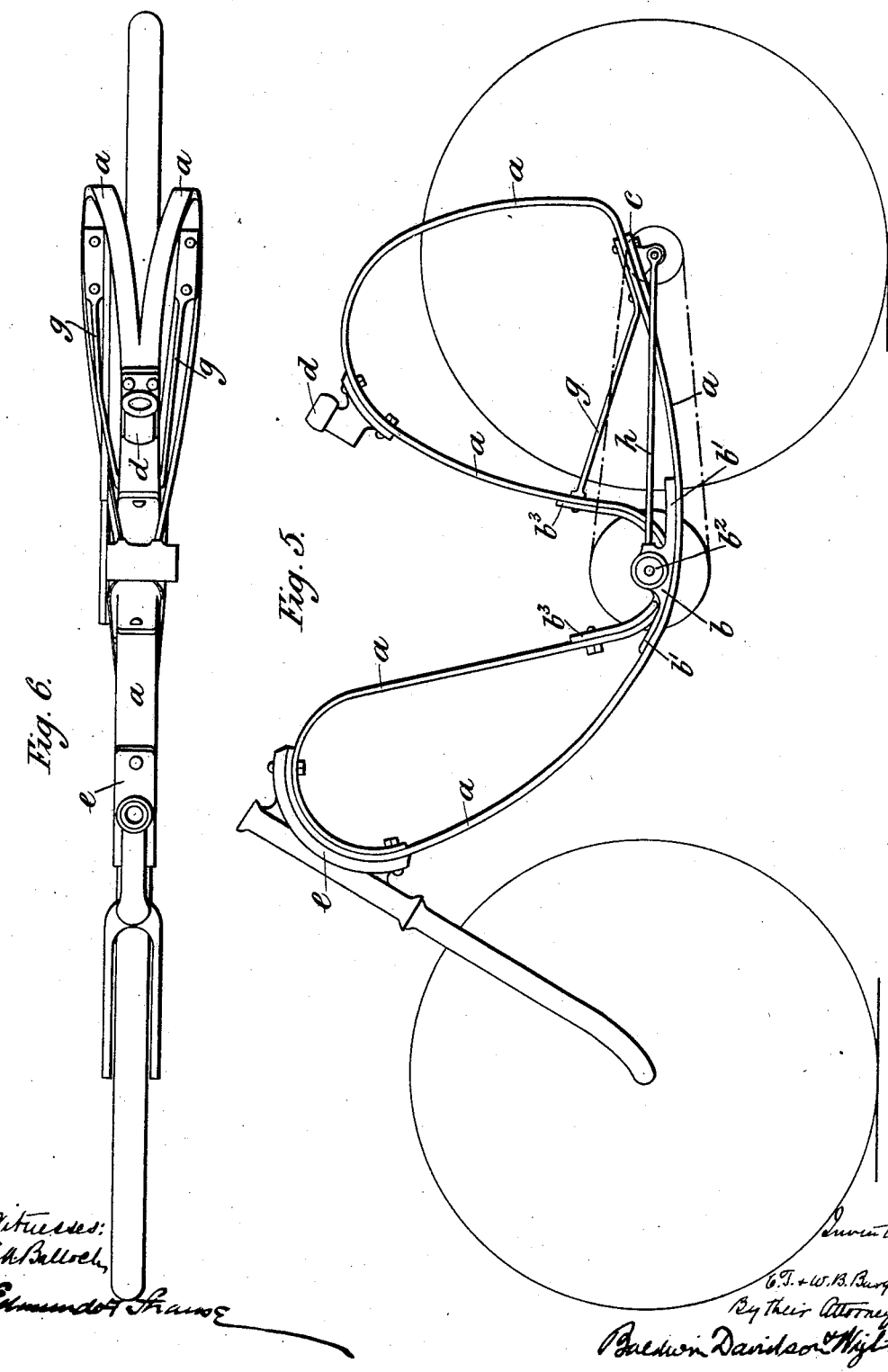

UNITED STATES PATENT OFFICE.

CHARLES THOMAS BURGESS AND WILLIAM BOWER BURGESS, OF BRENTWOOD, ENGLAND.

BICYCLE.

SPECIFICATION forming part of Letters Patent No. 606,704, dated July 5, 1898.

Application filed August 9, 1897. Serial No. 647,570. (No model.)

*To all whom it may concern:*

Be it known that we, CHARLES THOMAS BURGESS and WILLIAM BOWER BURGESS, subjects of the Queen of Great Britain, residing at Victoria Works, Brentwood, in the county of Essex, England, have invented certain new and useful Improvements in Bicycles, of which the following is a specification.

According to this invention we form the frame of a bicycle mainly from a flat strip or ribbon of tough wood or other material either in one piece or in two or more lengths end to end, so as practically to form one strip, the strip being bent to the required form, as hereinafter explained. Where the frame has to come on either side of the rear or driving wheel, the strip is slit longitudinally, so that one part may pass on one side, the other on the other. The bend at the forward end of the frame we secure to a correspondingly-curved plate or flange which projects from the back of the socket for the steering-wheel spindle. The lower part of the frame has brackets secured to it, in which are the bearings for the treadle-spindle and for the axle of the rear wheel. A bracket is also secured to the upper part of the frame to carry the seat. The parts of the bent frame may be laced with wire as a racket. This lacing serves not only to strengthen the frame, but also serves as a dress-guard where it extends on either side of the rear wheel. The frame may also be strengthened with stay-rods, if required.

The drawings annexed show examples of bicycle-frames constructed in the above manner.

Figure 1 is a side view of one example. Fig. 2 is a plan view of the same. Fig. 3 is a cross-section on the line 3 3, Fig. 1, passing through the bracket which carries the bearing for the treadle-spindle. Fig. 4 is a side view of another example slightly modified from the construction shown in Fig. 1. Fig. 5 is another slightly-modified example. Fig. 6 is a plan of the same.

In Figs. 1, 2, and 3, $a$ is the bent flat strip of tough wood or other material forming the frame; $b$ is the bracket for the treadle-spindle bearing; $c$, the brackets for the axle of the rear wheel, and $d$ the bracket for carrying the seat. $e$ is the curved plate which projects from the back of the socket which receives the steering-wheel spindle and to which the front end of the frame is secured.

The bracket $b$ is, as shown, of oblong trough form with flat sides and rounded bottom and ends. It has also two flanges $b'$ extending outward from it, one along the top of each of its sides. Projecting from the bottom is also the bearing $b^2$ for the treadle-spindle.

One end of the strip $a$ starts from the plate $e$, extending downward and afterward rearward. The portion extending rearward is slit longitudinally, so that one part of it may pass on one side of the rear wheel and the other on the other side. One part is secured to one flange $b'$ and the other to the other flange of the bracket $b$. One part is also secured to the top plate of one of the brackets $c$ at one of its ends and the other part to the top plate of the other bracket $c$. Afterward the strip is curved upward, then again downward in front of the rear wheel, and a bend in it is made to lie in the cup or hollow of the bracket $b$, the strip, which here may be undivided, passing downward between the divided parts of the strip which are secured to the flanges $b'$. The strip then extends upward to be secured to the curved plate $e$, passing between it and the first end of the strip. It is then again bent downward and passed into the cup or hollow of the bracket $b$ through a slit formed through the bottom of the cup to allow it to do so and passes out from the top of the rear end of the cup and over the top of the rear wheel to form a mud-guard above it. Here it passes between the two parts of the longitudinally-divided portion of the strip and is secured to these parts by a bracket or connecting-piece $f$, as shown in Fig. 1. The bracket $b$ may be formed with plates $b^3$, extending up from the top of its ends for the bent strip to be secured to, as shown in Fig. 1. Stays $g$ may also be made to extend from the top of the plate $b^3$, which is at the rear end of the bracket, to the bracket $c$, one on either side of the rear wheel. Other stays $h$ may also be made to extend from the lower part of the bracket $b$ to the lower part of the bracket c. The front and rear portions of the frame may also, as shown at Fig. 1, be laced with wire like a racket to give increased strength and to serve as a dress-guard where the frame extends on either side of the rear wheel. If the bicycle is for men, a stay may also be made to extend from the upper portion of the front loop of the frame to the upper portion of the rear loop.

In the modification shown at Fig. 4 the strip a is somewhat differently bent. One end of the strip lying in the curved cup of the bracket b is made to extend upward in front of the rear wheel, then downward on either side of this wheel, then again forward to be secured to the flanges b' of the bracket b, then upward, and again downward for the bend to be secured to the curved plate e. Afterward the downward continuation of the strip is made to pass into the curved cup or trough of the bracket b and then upward and over the top of the rear wheel to form a mud-guard. A stay i is also shown as extending from the bottom of the bracket b to the bottom of the socket which receives the steering-spindle.

In the modification shown at Fig. 5 both ends of the curved strip a are secured to the curved plate e, and the form of the bracket b is modified.

In all these examples it is not essential that the strip a should be in one continuous length. It is obvious that wherever the strip is secured to one or other of the brackets it might be divided across to form two portions, each portion being secured to the bracket, so that the two portions are connected together end to end and virtually form a single strip.

We claim—

1. A bicycle having its frame formed from a strip or ribbon of tough wood or other material bent into two upwardly-extending loops one extending forward and the other backward from the central portion of the frame and having this central portion secured to one bracket-piece, the portion of the strip connecting the lower part of the two loops being divided longitudinally and its two parts connected to side flanges of the bracket at a distance apart from one another and the portion connecting the upper portions of the two loops connected to a curved central portion of the same bracket.

2. A bicycle having its frame formed from a strip or ribbon of tough wood or other material bent into two loops one in front of the other and having the under side of each loop and the portion connecting them slit longitudinally and the two parts of this connecting portion secured to two plates or flanges one at each side of a bracket carrying the treadle-spindle bearing and also having the descending bend which connects the upper portion of the two loops passing down between these two parts and secured to a corresponding curved surface at the center of the bracket.

CHARLES THOMAS BURGESS.
WILLIAM BOWER BURGESS.

Witnesses:
WALTER J. SKERTEN,
T. J. OSMAN.